Aug. 4, 1936.  R. LEWIS  2,049,707
COMBUSTION CONTROL MECHANISM
Filed Nov. 18, 1932  3 Sheets-Sheet 1
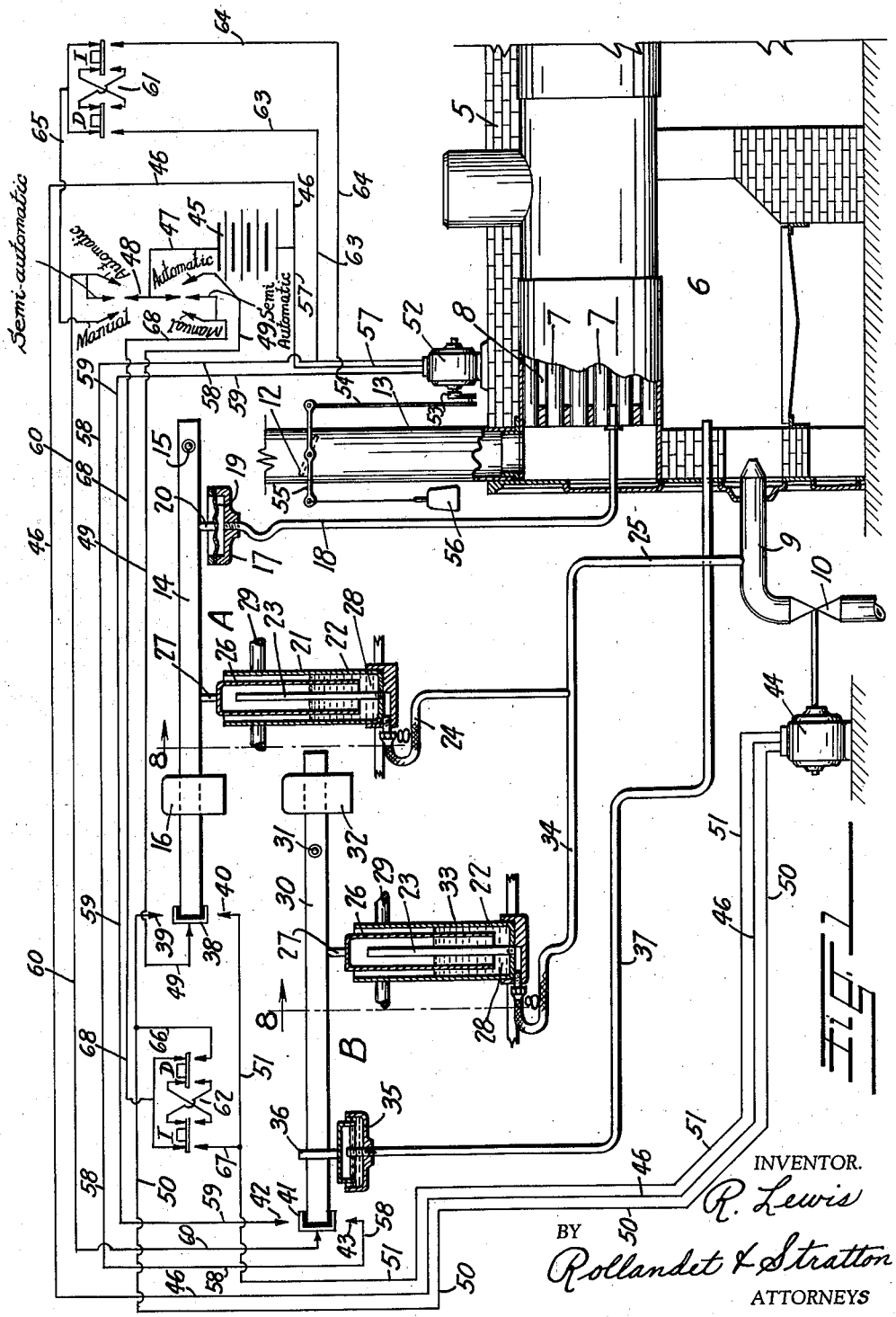
INVENTOR.
R. Lewis
BY
Rollandet & Stratton
ATTORNEYS

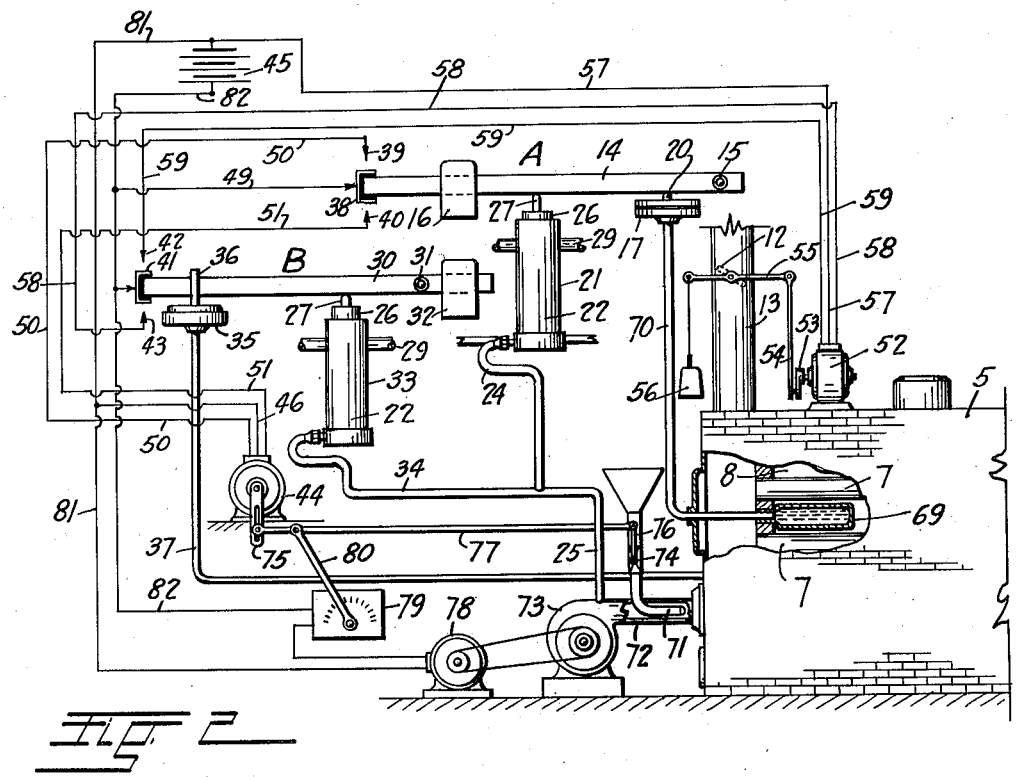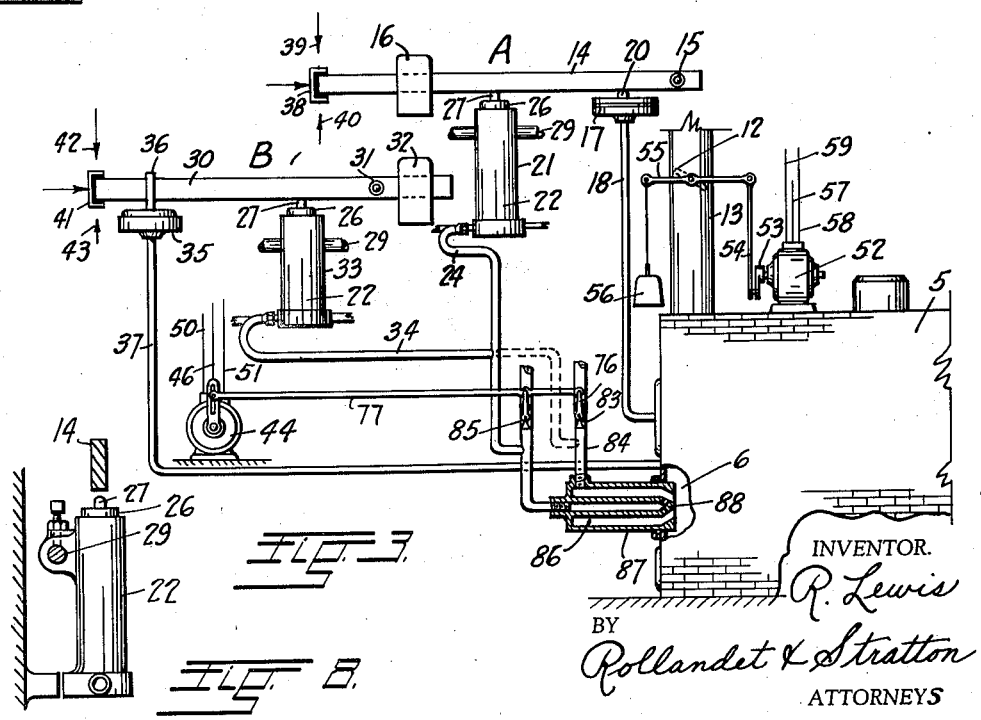

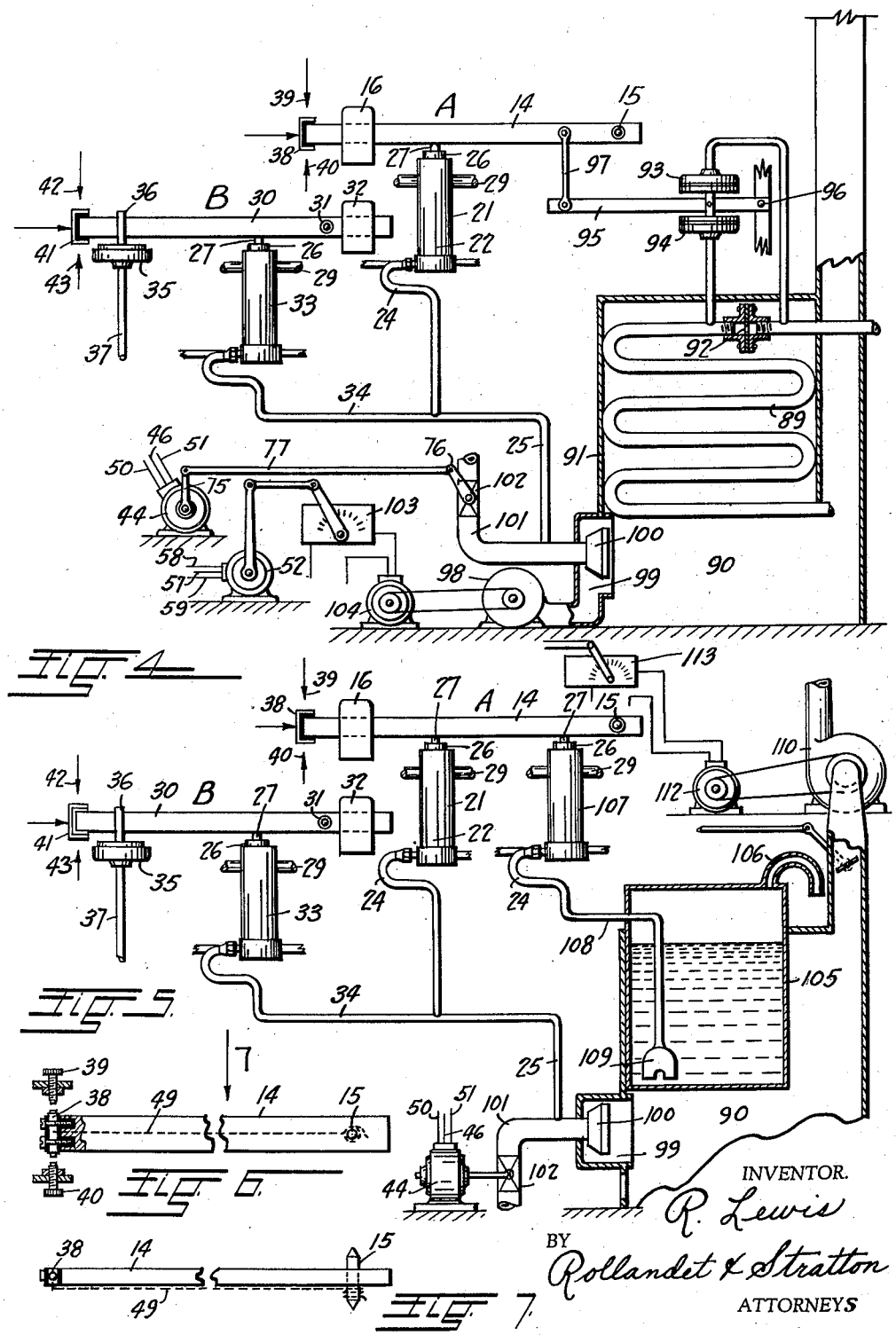

Patented Aug. 4, 1936

2,049,707

UNITED STATES PATENT OFFICE 2,049,707

COMBUSTION CONTROL MECHANISM

Robert Lewis, Englewood, Colo., assignor to The Denver Fire Clay Company, Denver, Colo.

Application November 18, 1932, Serial No. 643,231

13 Claims. (Cl. 236—14)

This invention relates to a method, system, and apparatus for regulating heat developed in a combustion space according to the demand of a fluid subjected to and influenced by the heat. It is an object of the invention to produce this result by controlling the supply of fuel and air by variations in the heated fluid, with respect to pressure, temperature or flow-velocity.

It is another object of the invention to provide in a system of the above-described character, means for automatically maintaining a predetermined air-fuel ratio in a combustion chamber, by the influence of variations in the heated medium, as stated hereinbefore.

A further object is to provide for the above purposes, a system and means for automatically varying the fuel-air ratio in heating apparatus, according to the amount of fuel consumed to produce a predetermined effect upon a heated fluid.

Another object is to produce the above-stated results through the medium of one or more fulcrumed beams that are influenced either directly or indirectly by variations in a heated fluid and in turn influence the supply of air and fuel to the combustion space to maintain a predetermined ratio.

Still another object is to provide for the above purpose two units cooperatively assembled, to respectively regulate the fuel supply and the air-supply to a combustion space, according to a given ratio.

A further object is to regulate the fuel supply and air-supply to a combustion space, through the medium of electric motors whose circuits are controlled by the units hereinabove referred to.

Another object is to provide in a system of the stated character, selective control means whereby the air supply and the fuel supply or the air supply alone may be automatically or manually regulated at the will of the operator.

Still other objects are to be found in details of construction and in novel and advantageous arrangements and combinations of parts, as will be fully disclosed in the course of the following description.

It is apparent that the system must necessarily be varied in accordance with the nature of the controlling factor, i. e., fluid-pressure, fluid-temperature or fluid-flow, and that other variations must be resorted to according to the character of the fuel, either gaseous, liquid or solid.

All of such variations will hereinafter be described with reference to the accompanying drawings, and it is to be understood that the said variations and other changes in the form and relative arrangement of the elements and parts included in the system may be made without departing from the spirit and scope of the invention as defined in the hereunto appended claims.

In the drawings, in the several views of which like parts are similarly designated,—

Figure 1 represents a partially sectional view of the system of mechanical and electrical devices, circuits and controlling media, in association with a heating apparatus in which the pressure of the heated fluid is the controlling factor, the heating apparatus being operated by gaseous fuel.

Figure 2 is a similar view of the apparatus and automatic controlling system in which the temperature of the heated fluid is the controlling factor, and in which the heating apparatus is operated by means of a solid fuel.

Figure 3 is a similar view of the apparatus and system in which the heating apparatus is operated through the medium of a liquid fuel, Figure 4 is a similar view of the system and apparatus in which the flow-velocity of the heated fluid is the controlling factor.

Figure 5 is a similar view in which the quantity of a heated fluid is the controlling factor.

Figure 6 is an elevation in detail of one of the fulcrumed beams used in the automatic controlling units.

Figure 7 is a view of the beam looking in the direction of the arrow 7 in Figure 6.

Figure 8 is an enlarged section on either of the lines 8—8 in Figure 1.

For a better understanding of the several forms of apparatus to which the system is applied, and of their analogy with respect to their influence upon the operation of the controlling system, attention is here called to the fact that where the controlling factor is either flow, quantity or temperature of the heated fluid, said factor is, in each instance, converted into pressure, so that with respect to the part taken by the factor in the operation of the system, the operation is invariably that of the system exemplified in Figure 1 of the drawings, in which fluid-pressure is the controlling factor.

Referring first to Figure 1, the numeral 5 designates a boiler of conventional construction having a combustion chamber 6, heat flues 7, and a water and steam space 8.

It is the pressure of fluid in the last-mentioned space, that controls the operation of the system. A gaseous fuel enters the combustion space through the nozzle of a conduit 9, and the flow through this conduit is controlled by a valve shown at 10.

The air-supply to the combustion chamber is regulated by a damper 12 in the stack 13 of the boiler.

The automatic controlling system comprises two units, A and B, which cooperate to regulate the fuel supply and the air supply or draft, according to a predetermined ratio.

The unit A has a beam 14 fulcrumed at 15 and carrying an adjustable weight 16. Two forces counteract gravitation of the beam under the influence of the weight, namely, the pressure of steam in the space of the boiler, and the pressure of the fuel supply through the conduit.

A diaphragm-box 17 is connected with the steam-space of the boiler by a partially flexible pipe 18 and a flexible diaphragm 19 in the box has a stud 20 engaging the underside of the beam.

A gasometer or manometer 21 has a fixed cup 22, a nozzle 23 within the cup connects with the gas supply conduit by pipes 24 and 25, and an inverted cup 26 engages the underside of the beam, through the medium of a stud 27. The cups are partially filled with mercury or other suitable liquid, shown at 28, and the pressure of the fuel entering through the nozzle 23 above the liquid body 28, presses the stud against the beam.

The pipe 24 is flexible and the manometer is slidably supported on a rod 29, substantially parallel with the beam so that the distance of the point of contact of the movable part of the manometer, from the point at which the beam is subjected to the pressure of the steam in the boiler, and from the fulcrum of the beam, may be varied to predetermine the pressure and fuel-air ratio maintained by the beam in association with a beam 30 of the unit B.

The last-mentioned beam, fulcrumed at 31, carries a weight 32.

A manometer 33, similar in construction to that of the beam 14, and similarly mounted, connects with the fuel-supply conduit 9 of the boiler, by means of a branch 34 of the pipe 25, and a second manometer 35 has its movable part connected with the beam by a strap 36, and is, by means of a pipe 37, connected with the combustion space 6 of the boiler so as to be influenced by the draft.

The beam 14 carries at one end a contact piece 38 for engagement with adjustable contacts 39 and 40 at opposite sides thereof, and the beam 30 carries a similar contact-piece 41 to engage with adjustable contacts 42 and 43.

As best shown in Figures 6 and 7 of the drawings, the contact-pieces 38 and 41 are insulated from their respective beams, and the contacts are screw-threaded for adjustment to regulate the points in the movement of the beams, when they are engaged by the contacts on the beams.

The same views show the method of connecting the wires 49 and 60 to the contacts of the respective beams, by placing them along the beams in connection with their trunnions.

The parts 38, 39 and 40 associated with the beam 14 of the unit A, constitute a circuit-breaker in circuits of a reversible electric motor 44, whose rotor is connected with the valve 10 of the fuel-supply conduit, to regulate the quantity of fuel that enters the combustion-chamber of the boiler in a given time.

Commencing at a source of electricity shown at 45, the circuits include a conductor 46, the motor 44, conductors 50 and 51 connecting, respectively, with the binding posts 39 and 40, the contact 38 on the beam 14, a conductor 49, a selector switch 48 and a conduit 47 connecting with the opposite pole of the source.

The parts 41, 42 and 43, associated with the beam 30 of the unit B, constitute the controlling medium of the circuits of a reversible motor 52, which by means of a crank 53 and a rod 54, connects with a lever 55 on the draft-regulating damper 12 of the boiler, counterbalanced by a weight 56.

The circuits of the motor 52, include, commencing at the source 45, the conductor 57, the motor 52, conductors 58 and 59 connected, respectively, with the contacts 43 and 42, the contact 41 of the beam 30, a conductor 60, the selector switch 48, and the conductor 47 connecting with the source. The circuits of the motor 52 are also controlled by an interlocked push-button switch 61, and the circuits of the motor 44 are controlled by a similar switch 62. The switch 61 is connected with the conductors 58 and 59 of the circuits of the reversible motor 52, by conductors 63 and 64, and a conductor 65 connects opposite sides of the switch 61 with the selector switch 48. Opposite sides of the switch 62 are connected with the conductors 50 and 51 of the circuits of the reversible motor 44, by conductors 66 and 67, and a conductor 68 connects opposite sides of the switch 62 with the selector switch 48.

The switches 48, 61 and 62 enable the operator to select one of three different methods of operation, namely, the automatic control of the system by the cooperative actions of the units A and B, the automatic control of the air-supply or draft of the furnace through the medium of the unit B and the manual control of the system, independent of the units A and B.

In the control of the system by means of the unit B independent of the unit A, the operation is semi-automatic.

By proper manipulation of the push-button switches, the air supply or draft, or the fuel supply may be increased in one position of the switches, while in another position, the air supply or draft or the fuel supply may be decreased.

The center or moving element of switch 48 is so constructed that contact is made simultaneously with the two positions marked "automatic", or the two positions marked "semi-automatic", or the two positions marked "manual".

When switch 48 is placed in the "manual" position, energy will be supplied through conductor 65 to switch 61 and through conductor 68 to switch 62. In switch 61, which is preferably a pushbutton mechanism, when button D (decrease) is depressed, current flows across the disk of button I (increase), then diagonally across to the disk of button D through conductor 63 to motor 52, causing the motor to rotate, thereby closing the damper and decreasing the draft. When the corresponding button of switch 62, also preferably of the pushbutton type, is depressed, a corresponding sequence of operation follows to influence the operation of motor 44 controlling valve 10.

It should be noted that the discs in switches 61 and 62 are conductors providing a path for the flow of electricity. Current is required to flow through both discs so a short circuit is avoided in case both buttons are depressed simultaneously. When switch 48 is placed in the semi-automatic position, switch 61 becomes inoperative as energy is no longer supplied to its contacts through conductor 65, and motor 52 can only be operated by closing of the contacts 42 and 43. Changing the position of switch 48 does not, however, disconnect switch 62 and motor 44 may still be manually operated. Manual operation of motor 52 disturbs the balance of beam 30 closing contact 42 or contact 43, causing a readjustment of damper 12 to provide the correct draft for the changed rate of fuel supply. When switch 48 is in automatic position, switches 61 and 62 are deenergized and movement of either valve 10 or damper 12 can be accomplished only by closing the contacts on the beams controlling these devices.

In the following description of the operation of the systems, the manual controls will be eliminated, since they are provided mainly to render the system available and operative under all conditions and do not affect the principle upon which the operation is based.

Under normal conditions, the beam 14 of the unit A is held in a position in which the contact 38 is separated from the contacts 39 and 40 against the pressure in the steam space of the boiler exerted through the medium of the diaphragm 19 and the pressure of the gaseous fuel supplied to the combustion space of the boiler, exerted upon the beam by means of the manometer 21. At the same time, the beam 30 of the unit B is maintained in its neutral position under the influences of the draft and the fuel-pressure in the furnace, communicated to the beam through the instrumentality of the manometers 35 and 33.

The beams in their normal positions open the motor-circuits in their respective circuit-breakers. The motors are thus normally in an inoperative position and the parts of the boiler actuated by the motors, i. e., the valve controlling the fuel supply and the damper regulating the draft or air supply are normally in a condition of rest. In the operation of the system, the unit A controls the fuel-supply under the influence of the steam-pressure in the boiler, and the unit B regulates the draft or air-supply according to the fuel-supply controlled by the other unit. Thus the two units cooperate to maintain a fuel-air ratio according to the amount of fuel consumed to maintain the steam-pressure at a predetermined point.

A decrease in the steam-pressure of the boiler, will cause downward deflection of the diaphragm 19, with the result that the pressure exerted at the point of the beam 14 engaged by the stud 20, is proportionately lessened.

The lever is, in consequence, moved about its fulcrum by the now overbalancing weight 16, with the result that the contact 38 is brought into engagement with the contact 40, closing one of the circuits of the motor 44, and increasing the opening of the valve 10 of the fuel-supply conduit 9. At the same time, the increased fuel-pressure will lift the beam 30 of the unit B, bringing the contact 41 into engagement with the contact 42 and closing a circuit of the motor 52 to open the damper. Thus a constant ratio between the fuel-supply and the air-supply is automatically maintained. The increased fuel-pressure lifts the beam 14 against the gravitative action of its weight, restoring the beam to its normal position in which the circuits of the motor 44 are open. At the same time, the increased draft in the boiler will cause the beam 30 to move downwardly, thereby breaking the circuit of the motor 52, as soon as the beam is returned to its normal position.

Under opposite conditions, when the steam pressure in the boiler increases, the operation of the two units is obviously reversed, the contact 38 of the beam 14 is brought in contact with the contact 39, closing the motor-circuit to cause the motor 44 to rotate in the opposite direction, thereby decreasing the opening of the valve 10.

Under the same conditions, the beam 30 is lowered to bring the contact 41 in engagement with the contact 43, thereby causing the rotor of the motor 52 to rotate in the opposite direction to close the damper 12, and thereby lessen the air-supply.

It will thus be seen that the three factors present in the operation of the boiler, namely, the fuel-pressure, the draft or air-supply, and the steam-pressure, are constantly and automatically maintained at a predetermined ratio.

The two units hereinabove described may be assembled for cooperation in one casing. Under ordinary conditions, if the operation is not varied by the switch-control, they maintain the air-fuel ratio automatically, under the influence of the pressure in the boiler, and this ratio may be made automatically variable in an increasing and decreasing ratio as well as in a straight line.

The system effects a positive operation of the fuel-supply valve and the damper, and it provides for direct compensation in variations of either the fuel-supply or the draft.

Where in the system of Figure 1, hereinabove described, the pressure of the heated fluid is the direct controlling factor, the system illustrated in Figure 2 is controlled by variations in the temperature of the heated fluid.

A capsule 69 filled with an expansible, temperature-sensitive liquid or gas, is placed in the steam-space of the boiler and connected with the diaphragm box 17 by a pipe 70. The contents of the capsule contract or expand according to temperature-variations of the steam, and in this manner, the pressure is again utilized to control the position of the beam of the unit A of the system.

In the construction shown in Figure 2, finely divided solid fuel suspended in air is used in the operation of the boiler. The fuel enters the combustion chamber of the furnace through a nozzle 71 inside the discharge conduit 72 of a fan or blower 73, which supplies the air current by which the fuel is carried into the combustion chamber.

A valve 74 controls the supply of fuel through the nozzle and this valve is, as before, connected with the reversible motor 44, whose operation is controlled by the unit A of the system. The connection is, in this instance, established through the medium of cranks 75 and 76 on the rotor of the motor and the valve 74, connected by a rod 77.

The blower 73 is continuously operated by an electric motor 78, and the velocity of this motor, and consequently that of the blower, are regulated by the motor 44 through the medium of a rheostat 79, whose movable element is connected with the rod 77 by an arm 80. The circuit of the motor 78 includes, commencing at the source 45, a conductor 81, the motor-field, the rheostat, and a conductor 82 connecting at the opposite side of the source. In all other respects, the construction and electrical connections of the elements of the system are the same as that shown in Figure 1 and hereinbefore described.

In Figure 3 of the drawings, oil or other liquid fuel is used in the operation of the boiler, the fuel is ejected into the combustion space of the boiler by air or steam, as a carrier and atomizing medium, or the fuel may be entered into the combustion chamber by externally applied pressure.

In the first instance, a valve 83 in an air or steam supply pipe 84 and a valve 85 in a fuel-supply pipe are controlled by the motor 44, the pipes connecting respectively with a jacket 86 of a burner 87, and with a nozzle 88 within the same. In all other respects, the system is the same as that shown in Figure 1.

Figure 4 illustrates a modification of the system when the flow of a heated fluid is the controlling factor. A conduit 89 subject to the heat developed in the combustion space 90 of a furnace 91, provides for the circulation of any fluid, either gaseous, liquid or semi-liquid.

A diaphragm 92 in the conduit provided with an opening of reduced diameter, functions as a medium to establish differential pressures at opposite sides thereof, whereby variations in the flow of a fluid through the conduit may be measured. In this instance, two diaphragm boxes, manometers, or other pressure-responsive elements 93 and 94 are employed, the movable parts of the elements being connected to a lever 95 in opposition to each other.

The lever 95 is fulcrumed as at 96, and its free end is connected with the beam 14 of the unit A by a link 97. In the operation of the system, this link-connection takes the place of the pressure-responsive element 17 of the before-described forms illustrated in Figures 1 to 3, inclusive.

The differential pressures at opposite sides of the diaphragm are here the medium by which the beam 14 of the unit A is subjected to pressure as the controlling factor, and it is to be understood that while for simplicity in illustration, an apertured diaphragm has been shown, the same results may be obtained by means of a Pitot tube or a Venturi tube or other similar appliance.

In Figure 4, the damper has been omitted and the draft in the furnace is controlled by a forced draft appliance, such as a blower 98. This blower connects with the combustion chamber of the furnace by a conduit 99, at the mouth of which is a burner 100 connected with a source of fuel-supply by a conduit 101. A valve 102 in the conduit, is as before controlled by the motor 44, associated with the unit A of the system, but the motor 52 of the unit B is in this case connected with the moving element of a rheostat 103 which controls the movement of a motor 104 by which the blower is operated. Otherwise the system is the same as that hereinbefore described.

In Figure 5, the combustion control is responsive to variable head-pressures of a liquid body, or, in other words, to variable quantities of the heated liquid. In this case, it is the quantity of the liquid, that is converted into the pressure which controls the movement of the beam of the unit A of the system.

The liquid is contained in a closed tank 105 having a vent 106. A manometer 107 takes the place of the diaphragm box of the construction of Figure 1, and a pipe 108 connected with the manometer terminates in a bell 109 in the lower portion of the tank. The manometer and its conduit are filled with air, so that the pressure in the manometer is at all times proportional to the height of the liquid in the tank.

An induced draft in the combustion chamber of a furnace below the tank is produced by means of a suction fan 110 operated by a motor 112, similar to the motors 78 and 104 of the constructions shown in Figures 2 and 4.

A rheostat 113 controls the supply of current to the motor and the movable element of the rheostat is connected with the motor associated with the unit B of the system. Otherwise the system is again similar to that of Figure 1.

All of the above described variations are within the scope of the hereunto appended claims, it being apparent that the operation of the unit A is at all times controlled by pressure, irrespective of whether the controlling factor is pressure, temperature, flow or head pressure of the heated fluid, and that in each case a predetermined air-fuel ratio is maintained in accordance with this pressure.

It is to be understood that if in the induced or forced draft installations the speed of the fan motor must be maintained constant, the air supply may be varied by dampers in the air duct, which dampers would be controlled by the reversible motors.

What I claim and desire to secure by Letters Patent is:

1. A system for regulating the operation of an appliance for heating a substance by the combustion of a fuel under the influence of a draft, comprising a valve controlling the fuel supply, a unit influenced by the fuel supply and by pressure developed in a variable condition of the heated substance, means for regulating the valve by the operation of said unit, an element for regulating the draft, a second unit influenced by variations in the fuel supply and the draft, and means controlling said element by operation of the second unit.

2. A system for regulating the operation of an appliance for heating a substance by the combustion of a fuel under the influence of a draft, comprising a device controlling the fuel supply, an electric motor in operative relation to said device, a device controlling the draft, a second electric motor in operative relation to the last-mentioned device, circuits for the motors, a circuit breaker in the circuit of the first-mentioned motor, influenced by variations in the fuel supply and in a condition of the heated substance, and a circuit breaker in the circuit of the second motor, influenced by the fuel supply and the draft.

3. A system for regulating the operation of an appliance for heating a substance by the combustion of a fuel under the influence of a draft, comprising a device controlling the fuel supply, a reversible electric motor in operative relation to said device, a device controlling the draft, a second reversible electric motor in operative relation to the last-mentioned device, circuits for the motors, a circuit breaker in the circuit of the first-mentioned motor, influenced by variations in the fuel supply and in a condition of the heated substance, and a circuit breaker in the circuit of the second motor, influenced by the fuel supply and the draft.

4. A system for regulating the operation of an appliance for heating a substance by the combustion of a fuel under the influence of a draft, comprising a device controlling the fuel supply, an electric motor in operative relation to said device, a device controlling the draft, a second electric motor in operative relation to the last-mentioned devices, circuits for the motors, a circuit breaker in the circuit of the first-mentioned motor, influenced by variations in the fuel supply and in a condition of the heated substance, a circuit breaker in the circuit of the second motor, influenced by the fuel supply and the draft, manual controlling means in the circuits, and a selective switch in the circuits to vary the path of current so as to close the circuits, either manually or by the circuit-breakers at the will of the operator.

5. The method of regulating the operation of an appliance for heating a substance by the combustion of a fuel, under the influence of a draft, comprising establishing a predetermined ratio between a condition of the heated substance and the pressure of fuel feed, establishing a predetermined ratio between the pressure in a zone of combustion and the pressure of fuel feed, varying the fuel feed pressure by variations in condition of the heated substance, and varying the draft by pressure variations in the fuel feed in a system in which a change in any one of the controlled factors is directly compensated by changes in the respective controls to maintain the predetermined ratios.

6. The method of regulating the operation of an appliance for heating a substance by the combustion of a fuel, under the influence of a draft, comprising establishing a predetermined ratio between the pressure in a zone of combustion and the pressure of fuel feed, maintaining a substantially constant ratio between the pressures by a control responsive to variations of either pressure, and effecting during variation of one of said pressures, an immediate compensation of the unvaried pressure to thereby maintain the predetermined ratio.

7. The method of regulating the operation of an appliance for heating a substance by the combustion of a fuel, under the influence of a draft, comprising establishing a predetermined ratio between the pressure in a zone of combustion and the pressure of fuel feed, maintaining a substantially constant ratio between the pressures by a control responsive to variations of either pressure, and effecting during variation of one of said pressures, an immediate compensation of the variable pressure to thereby maintain the predetermined ratio.

8. The method of regulating the operation of an appliance for heating a substance by the combustion of a fuel in the presence of air, comprising controlling the fuel supply and the air-intake in a predetermined ratio, by two operating forces responsive to variations in certain factors, namely, the fuel supply, the air-intake and the heated substance, each force being responsive to variations in two of the factors, with one factor common to both forces.

9. The method of regulating the operation of an appliance for heating a substance by the combustion of a fuel in the presence of air, comprising controlling the fuel supply and the air-intake in a predetermined ratio, by two operating forces responsive to variations in certain factors, namely, the fuel supply, the air-intake and the heated substance, each force being responsive to variations in two of the factors, one of said factors being its controlled factor.

10. The method of regulating the operation of an appliance for heating a substance by the combustion of a fuel in the presence of air, comprising separately controlling the fuel supply and the air-intake in a predetermined ratio, by two operating forces responsive to variations in certain factors, namely, the fuel supply, the air-intake, and the heated substance, each force being responsive to variations in two of the factors, with one factor common to both forces.

11. The method of regulating the operation of an appliance for heating a substance by the combustion of a fuel in the presence of air, comprising controlling the fuel supply and the air-intake in a predetermined ratio, by two operating forces responsive to pressure variations in certain factors, namely, the fuel supply, the air-intake, and the heated substance, each force being responsive to variations in two of the factors, with one factor common to both forces.

12. The method of regulating the operation of an appliance for heating a substance by the combustion of a fuel in the presence of air, comprising controlling the fuel supply and the air-intake in a predetermined ratio, by two operating forces responsive to variations in certain factors, namely, the fuel supply, the air-intake, and the heated substance, both forces being responsive to the same variations in one factor and each of the forces being responsive to variations in one of the other factors.

13. A system for regulating the operation of an appliance for heating a substance by the combustion of a fuel under the influence of a draft, comprising a fulcrumed beam, devices for subjecting the beam to pressure by a condition of the heated substance and by the fuel supply, a circuit controlled by said beam, an element controlling the fuel supply by movement of the beam, a second fulcrumed beam, devices subjecting the second beam to pressure by the fuel supply and by the draft, a circuit controlled by the second beam, and an element controlling the draft by movement of the second beam.

ROBERT LEWIS.